(12) United States Patent
Burns et al.

(10) Patent No.: US 6,895,013 B1
(45) Date of Patent: May 17, 2005

(54) COHERENT ACCESS TO AND UPDATE OF CONFIGURATION INFORMATION IN MULTIPROCESSOR ENVIRONMENT

(75) Inventors: Barry S. Burns, Apex, NC (US); Randal Everhart, Apex, NC (US)

(73) Assignee: Cisco Technology, Inc., San Jose, CA (US)

(*) Notice: Subject to any disclaimer, the term of this patent is extended or adjusted under 35 U.S.C. 154(b) by 925 days.

(21) Appl. No.: 09/791,255

(22) Filed: Feb. 23, 2001

(51) Int. Cl.[7] .................... H04L 12/56; G06F 15/16
(52) U.S. Cl. .................... 370/401; 712/28; 712/227
(58) Field of Search .................... 370/400–401, 370/409, 419; 712/10–15, 18–19, 21, 28, 227

(56) References Cited

U.S. PATENT DOCUMENTS

| | | | |
|---|---|---|---|
| 5,515,522 A | * 5/1996 | Bridges et al. | 711/141 |
| 6,128,656 A | 10/2000 | Matchefts et al. | 709/223 |
| 6,195,739 B1 | 2/2001 | Wright et al. | 712/19 |
| 6,370,617 B1 | * 4/2002 | Lu et al. | 711/118 |
| 2003/0014612 A1 | * 1/2003 | Joy et al. | 712/215 |

OTHER PUBLICATIONS

U.S. Appl. No. 09/106,478, filed Jun. 29, 1998, Kerr et al.
U.S. Appl. No. 09/181,251, filed Oct. 28, 1998, Marshall.
U.S. Appl. No. 09/561,151, filed Apr. 28, 2000, Podanoffsky.
U.S. Appl. No. 09/790,968, filed Feb. 22, 2001, Brandt et al.
U.S. Appl. No. 09/791,062, filed Feb. 22, 2001, Muntz.
U.S. Appl. No. 09/791,063, filed Feb. 22, 2001, Maruthingendra et al.

* cited by examiner

Primary Examiner—John Pezzlo
Assistant Examiner—Saba Tsegaye
(74) Attorney, Agent, or Firm—Cesari and McKenna, LLP (57) ABSTRACT

A database management and indexing technique provides coherent access to and update of dynamic configuration information stored in a database associated with a multiprocessing environment of an aggregation router. The multiprocessing environment comprises a forwarding engine configured as a computing matrix of processors that operate on packets in a parallel as well as a pipeline fashion. A unique handle, i.e., a virtual common coherency index (VCCI) value, is associated with an interface regardless of whether it is a virtual or a physical interface. When a packet enters the computing matrix, it is classified and assigned a VCCI value based upon the interface over which it is received at or transmitted from the router. The assigned VCCI value is then passed along with the packet to each feature that processes the packet.

28 Claims, 7 Drawing Sheets

COHERENT ACCESS TO AND UPDATE OF CONFIGURATION INFORMATION IN MULTIPROCESSOR ENVIRONMENT

FIELD OF THE INVENTION

The present invention relates to multiprocessor environments and, in particular, to coherent updates of configuration data in a multiprocessor environment of an intermediate node, such as an aggregation router, used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate network node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer, i.e., layer 3, of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router is an access router configured to provide high quality of service and guaranteed bandwidth for both data and voice traffic destined for the Internet. The aggregation router also provides a high degree of security for such traffic. These functions are considered "high-touch" features that necessitate substantial processing of the traffic by the router. More notably, the aggregation router is configured to accommodate increased density by aggregating a large number of leased lines from ISP subscribers onto a few trunk lines coupled to an Internet backbone.

In addition to deployment at a POP, the aggregation router may be deployed in a telephone company central office. The large numbers of subscribers connected to input interface ports of the router are typically small to medium sized businesses that conduct a substantial portion of their operations "on-line", e.g., over the Internet. Each of these subscribers may connect to the aggregation router over a high reliability link connection that is typically leased from, e.g., a telephone company provider. The subscriber traffic received at the input interfaces is funneled onto at least one trunk interface. That is, the aggregation router essentially functions as a large "fan-in" device wherein a plurality (e.g., thousands) of relatively low-speed subscriber input links is aggregated onto a single, high-speed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are 28 T1s to each T3 connection; a T3 connection thus has an effective data rate of approximately 42 Mbps. On the other hand, the effective data rate of an OC-12 trunk interface connection is typically 622 Mbps. As noted, the aggregation router receives a plurality of subscriber inputs and aggregates them onto a single output trunk. However, not all inputs are constantly in use and, through the use of statistical multiplexing, the number of input subscriber lines that can be disposed over a single output trunk at one time can be determined.

The advent of large-scale, channelized interfaces has resulted in a vast number of channels that can be created as virtual interfaces over a single physical connection. Channelized T3 (CT3) is an example of a line card having such interfaces. Typically, each T3 port of a CT3 line card can be configured into 28 T1s and each T1 can be configured into 24 DS0 channels for a maximum of 672 interfaces per port. Here, an interface may be defined as an element that can be referenced by the combination of a slot (i.e., line card) number, port number and channel number of a router. The channels or DS0 "time slots" may represent subscribers, each of which may have varying bandwidth up to the maximum bandwidth of the T1.

In an implementation of an aggregation router having a network processor, the computing architecture may comprise a multiprocessing environment configured as a matrix of processors that operate in a parallel (column-wise) as well as a pipeline (row-wise) fashion. Packets enter the computing matrix on a quasi-randomly selected pipeline row of the matrix and each column of processors processes the packets in accordance with a designated task, i.e., feature. Upon entering the matrix, each packet is classified according to the interface over which it is received at the router. Each processor of a column may need to "lookup" configuration information, such as state, statistical and configuration data, stored in memory and that are utilized in the classification and routing of the packet through the system. Once it completes its processing task, the processor passes the packet to a processor in a next column of the matrix.

A database comprising various data structures may be used to organize the configuration information in the memory. At a specific instance in time as the packets move through the computing matrix, different packets are at different processor locations within the matrix. If changes or updates need to be made to these data structures, it is desirable that they be done in a fashion that does not disrupt the coherency of the database or packets currently being processed by the matrix. Data coherency is needed to maintain the stability of the computing environment as well as the integrity of packet data. A partially updated database could result in processor exceptions, processing loops, corrupted packet data, incorrect statistics, etc.

One approach that may be used to maintain data coherency is to prevent new packets from entering the matrix until all current packets are completely processed, i.e., wait for the pipelines to "drain". However, this approach is inefficient since it requires stalling of some, if not most, of the processors for the period of time needed to drain the pipelines. For a multiprocessing environment where there are many (e.g., greater than 8,000) configurable entries in the database and where packets are allowed to make multiple "passes" through the computing matrix, this period of time may be substantial.

For example, assume the processors of the matrix are arrayed in a 4-row by 8 column configuration. In addition, assume a clock cycle period for the matrix is 10 nanoseconds and the number of cycles allotted per column of processors to complete processing is 100. The time consumed to enable all of the packets to exit the matrix in a single pass through the pipeline rows is thus 8 microseconds (i.e., 8 columns× 100 cycles per column×10 nanoseconds per cycle). For those packets requiring multiple passes through the matrix, 8 microseconds per pass are consumed. Assume further that the database requires updating and that the pipelines of the matrix are drained prior to such updating. Therefore, a substantial portion of the processor resources is "wasted" (stalled) for tens of microseconds each time the database is updated. If the frequency of updates is high, performance of the computing matrix, and the router, is adversely impacted. The present invention is directed, in part, to obviating the need to stall packet processing within the computing matrix during updates of the configuration information database.

The lookup operations used to access the configuration information may be based on either the input interface over which the packet was received at the router or the output interface over which the packet is transmitted from the router, depending on the feature that is currently processing the packet. In addition, the packet may be received at or transmitted from the router in connection with a session that is established over the input or output interface. The input and/or output interface may comprise either a physical interface or a virtual interface wherein, in this context, the physical interface provides "dedicated" bandwidth to the session, whereas the virtual interface does not dedicate its entire bandwidth to the session. That is, the virtual interface session must contend for bandwidth with other protocols, such as layer 2 protocols, running over that interface.

The configuration lookup operation typically involves the use of a conventional mapping table wherein an index associated with either the physical interface (i.e., the physical interface index) or the virtual interface (i.e., the virtual interface index) is provided to the table which, in turn, generates a "handle". The handle may then be used to lookup (access) certain configuration-related information on a per packet basis for the routing and classification features implemented by the computing architecture. In a multiprocessing environment wherein multiple processors "act on" (process) a single packet, each processor may be responsible for determining the input/output interface type needed to generate the handle used to access the configuration information. This results in the need to test for interface types many times during the course of packet processing. Since the computing matrix of a network processor based router limits the number of cycles and bandwidth allocated to a configuration lookup operation, it is important to be as efficient as possible in terms of memory bandwidth and processor cycles. The present invention is also directed, in part, to providing a unique handle that may be used across the pipeline of processors to access configuration information stored in the memory associated with the matrix.

An issue associated with the conventional mapping table is that use of the physical and virtual interface indexes requires an arbitrarily large configuration information database. For example, assume the physical interface index is a 21-bit value derived from a combination of a particular channel associated with the physical interface and a particular line card of the router associated with the channel. The 21-bit physical interface index yields 2 million possible physical interfaces (values), each of which may have associated virtual interfaces (values). These virtual interfaces have associated virtual circuit identifier values that may range from a 10-bit frame relay data link control identifier (DLCI) value to a 24-bit asynchronous transfer mode (ATM) virtual path identifier (VPI)/ virtual channel identifier (VCI) value. Therefore, the lookup "address" space of the database may be 45 bits (or 35,184,372,088,832 entries) which is generally unmanageable. Moreover, if each entry consumed only 1 byte of data, this would represent approximately 35 terabytes of information that, in turn, would require an impractical amount of memory. (Note that 10 terabytes is the printed collection of the US Library of Congress.) The present invention is further directed to reducing the lookup address space of a configuration information database to a manageable space that can be used in a multiprocessing environment.

SUMMARY OF THE INVENTION

The present invention comprises a database management and indexing technique that provides coherent access to and update of dynamic configuration information stored in a database associated with a multiprocessing environment of an intermediate node, such as an aggregation router. The multiprocessing environment comprises a forwarding engine configured as a computing matrix of processors that operate on (process) packets in a parallel (column-wise) as well as a pipeline (row-wise) fashion. The database management aspect of the inventive technique ensures data coherency throughout the computing matrix, while enabling updates to the database without stalling packet processing. In addition, a "virtual" indexing aspect of the invention enables fast and In addition, a "virtual" indexing aspect of the invention enables fast and efficient access to configuration information on an interface, sub-interface and/or virtual circuit basis.

According to the invention, a unique handle, i.e., a virtual common coherency index (VCCI) value is associated with an interface regardless of whether it is a virtual or a physical interface. When a packet enters the computing matrix, it is classified and assigned a VCCI value based upon the line card interface over which it is received at (or transmitted from) the router. The assigned VCCI value is then passed along with the packet to each feature that processes the packet. The VCCI value thus remains constant for a packet for the duration of packet processing.

In the illustrative embodiment, packet classification is effected using an interface control block (ICB) index to access a novel multi-stage mapping arrangement that generates the VCCI value. A first stage of the mapping arrangement involves use of the ICB index to access an entry of an ICB table stored in a memory associated with the computing matrix. The ICB index is preferably derived from a combination of a resource (i.e., line card) number and a channel number associated with the packet. From the ICB entry, a second stage lookup operation is performed to obtain the VCCI value. Here, a pointer referencing a VCCI mapping structure (array) is retrieved from the entry. For simple interfaces, there is only one element of the array containing the VCCI value. For complex interfaces, a virtual circuit identifier of the packet is used to index into the multi-element VCCI mapping array to obtain the VCCI value. The VCCI value is then forwarded with the packet through all routing and classification features in the computing matrix. The VCCI value is used by "lookup" code of the features to quickly retrieve any configuration information from the database that may be needed to process the packet.

A supervisor (route) processor of the aggregation router allocates the VCCI values based on the physical and logical configuration of interfaces on the router. These "current" VCCI values are loaded into data structures of the mapping arrangement. If the configuration information stored in the database and related to a particular interface needs updating, the route processor generates a new VCCI value for that interface. Generation of the new VCCI value is achieved by selecting the "oldest" unused VCCI value from a pool of unused values. The route processor then updates the database of each column with new configuration information for the updated interface and, thereafter, updates the VCCI mapping table with the new VCCI value. Notably, these updates occur atomically with respect to packet processing as data coherency is maintained within the computing matrix. That is, new packets entering the matrix and associated with the updated interface are assigned the new VCCI value, while packets currently in the matrix use the old VCCI value. After a period of time sufficient to accommodate the latency needed to "flush" the current packets through the matrix, the old VCCI value is released.

Advantageously, the novel database management and indexing technique provides database coherency in a multiprocessor environment, while enabling updates of the database without stalling packet processing. The inventive technique provides a generic configuration lookup procedure for all router interfaces that may have widely varying hardware and software interfaces and capabilities. To that end, the novel technique requires generation of a VCCI value assigned to a packet only once during packet processing, thereby reducing the number of lookup operations in a multiprocessing environment. The technique also reduces the sizes of the mapping tables to a manageable limit, while conserving memory and memory bandwidth.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

Figure 1:
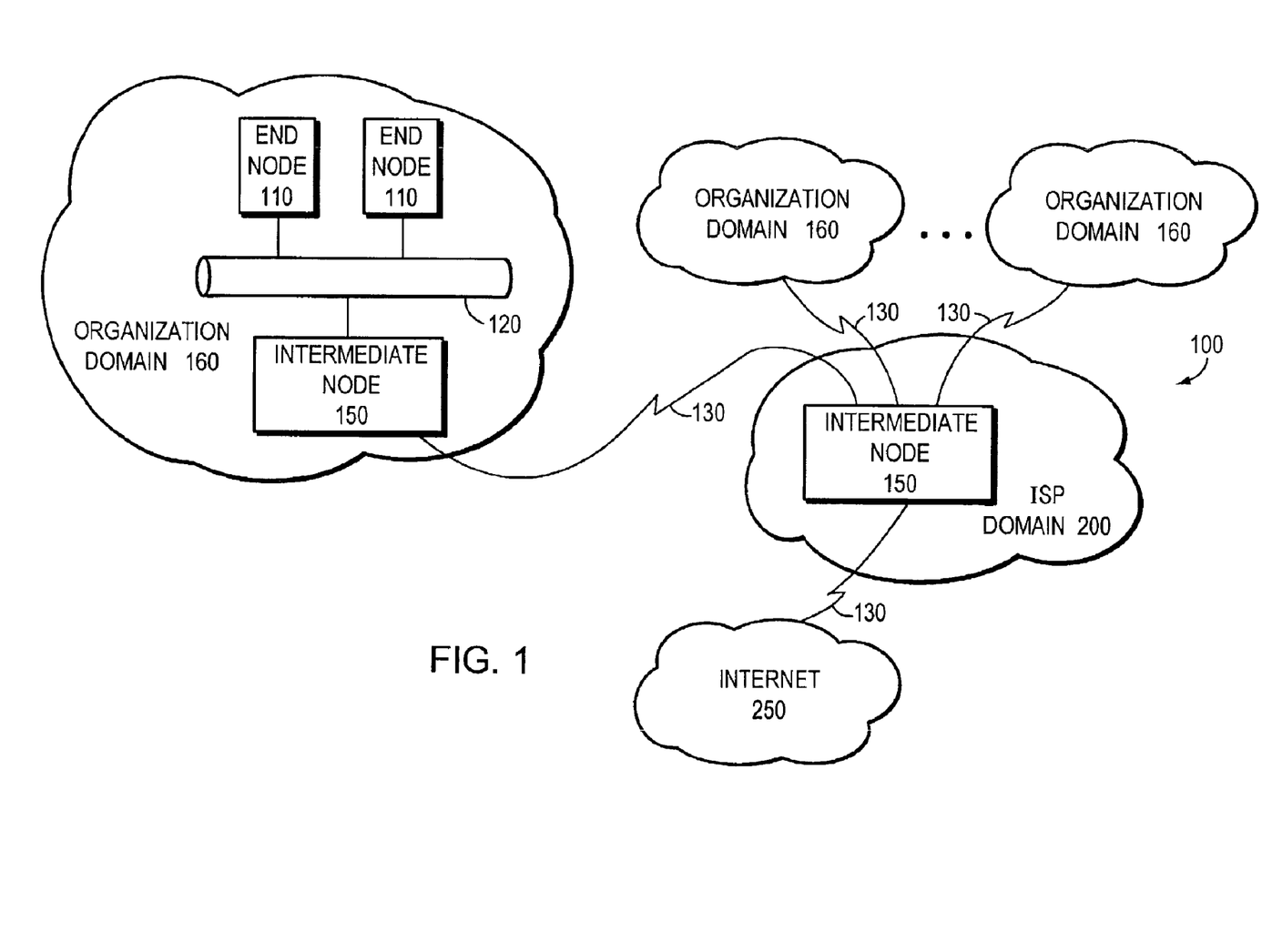
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
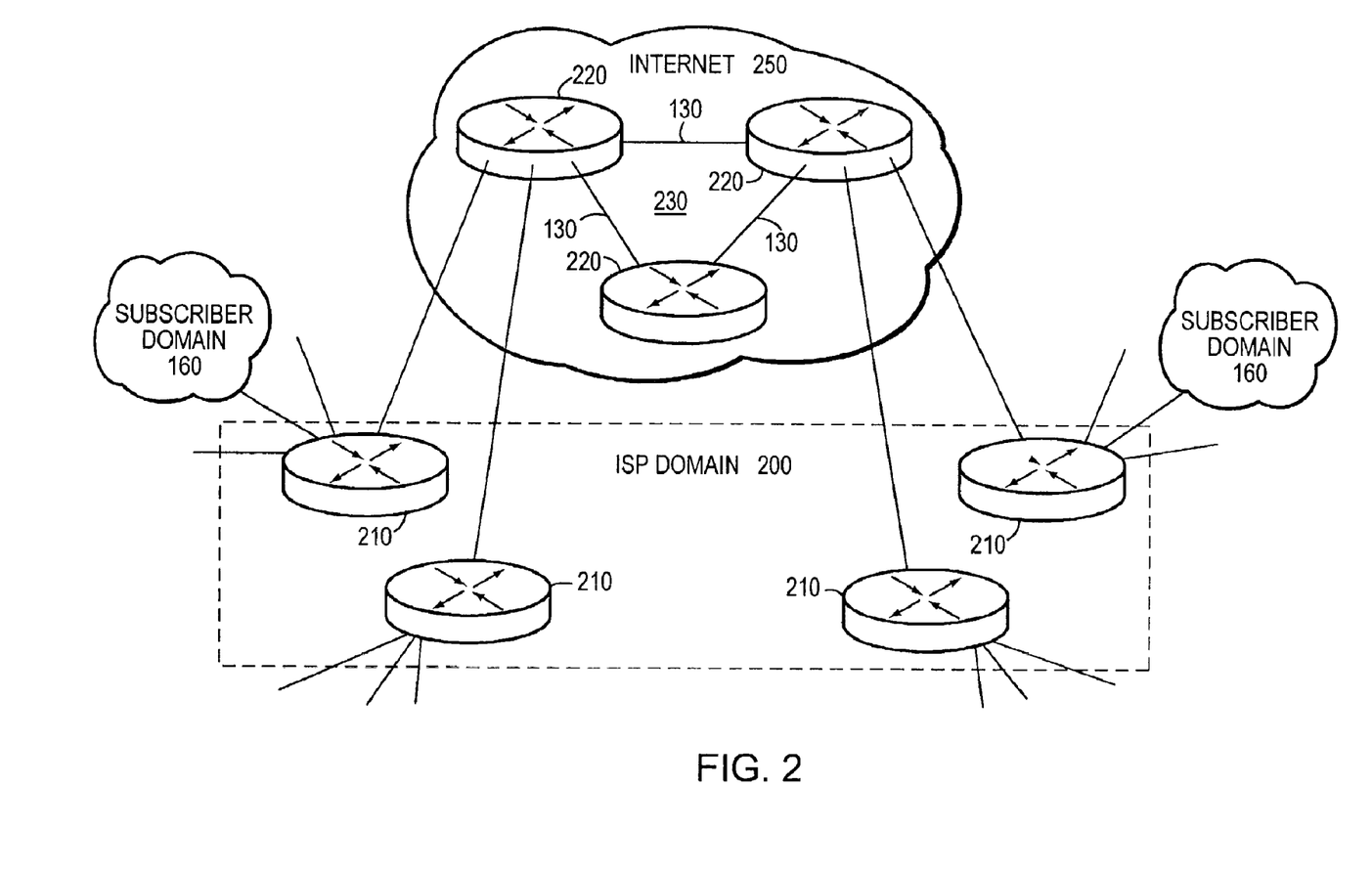
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
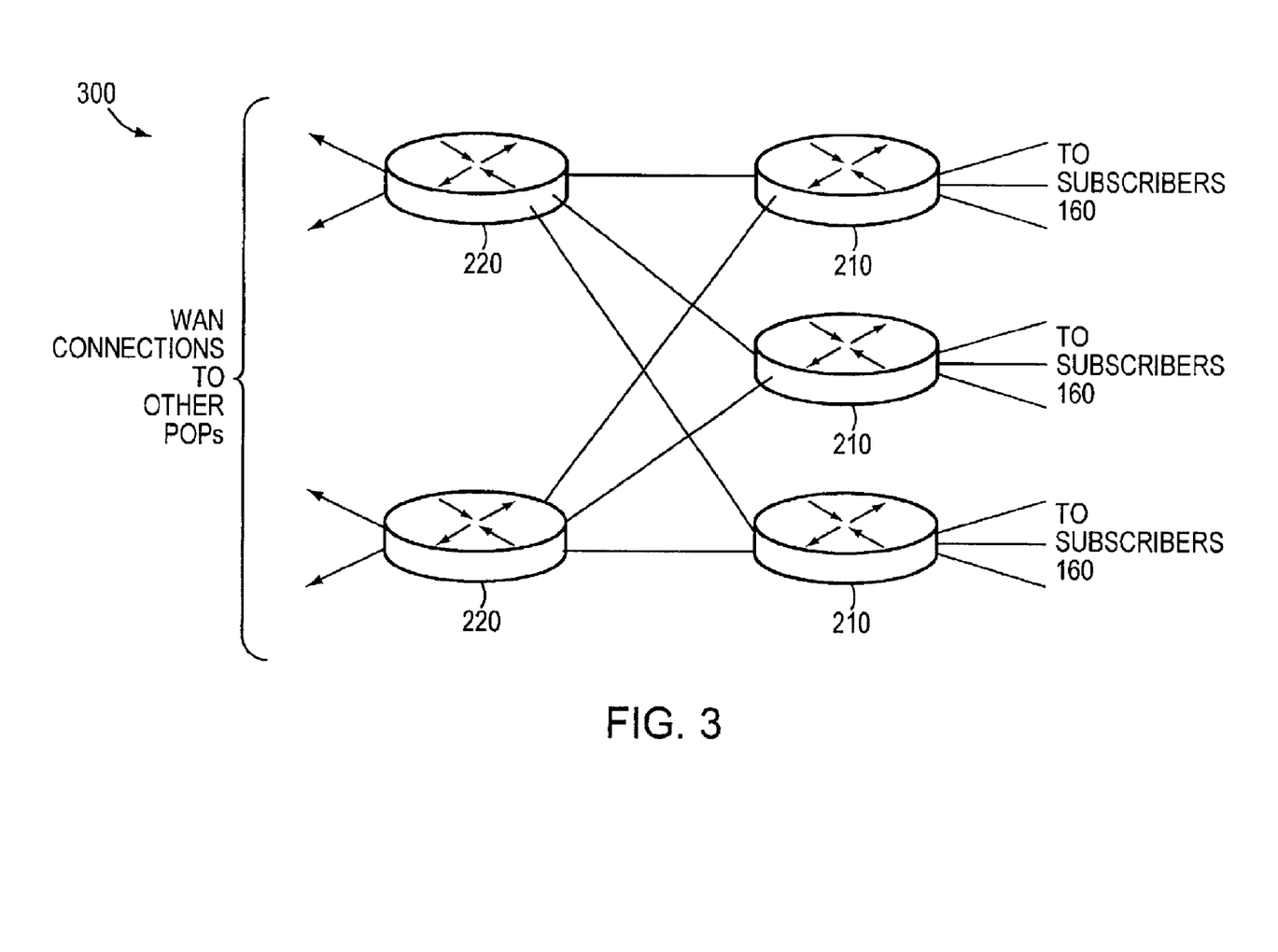
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The back-bone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 4:
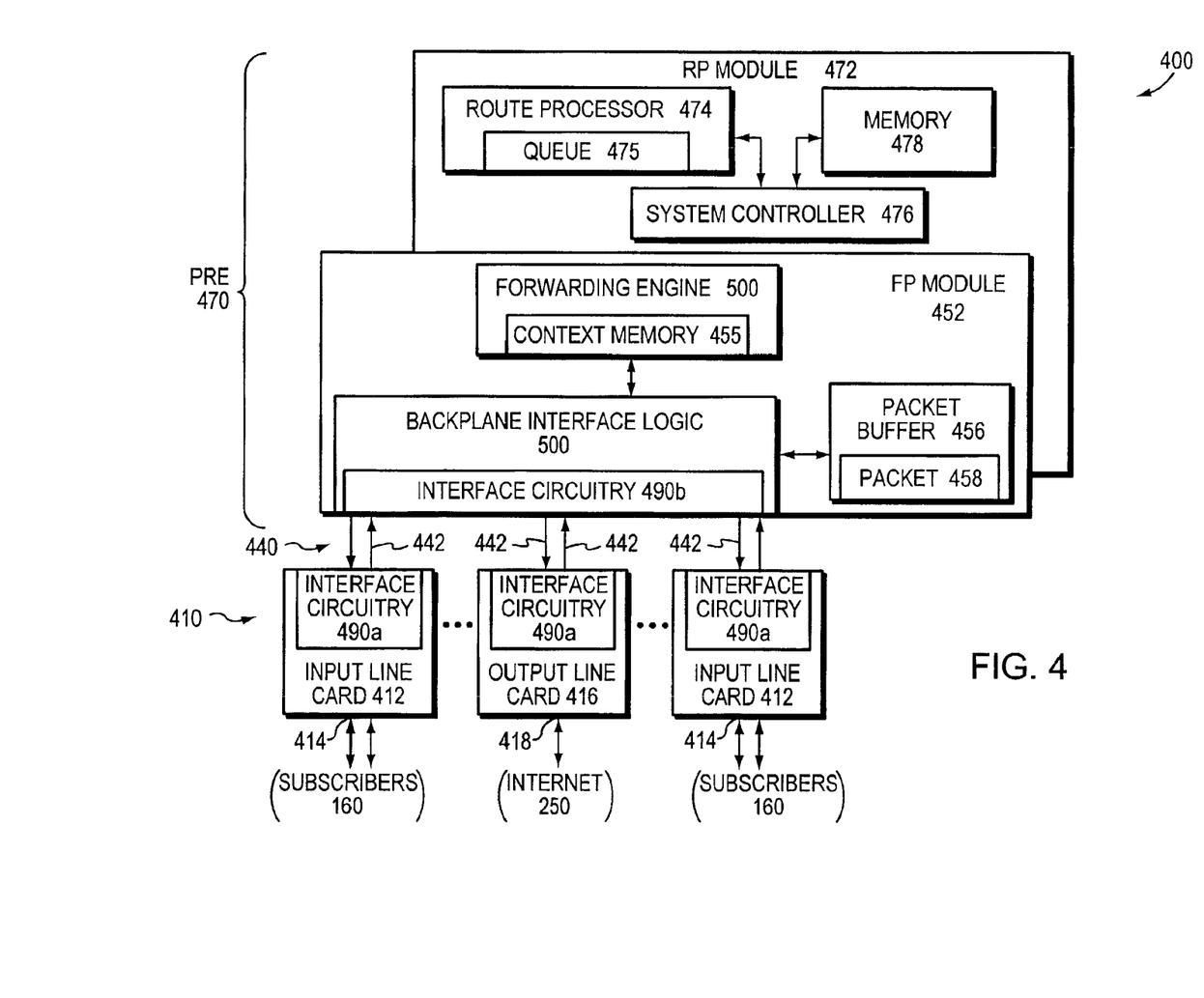
FIG. 4 is a schematic block diagram of an aggregation router that may be advantageously used with the present invention.

FIG. 4 is a schematic block diagram of an aggregation router 400 that may be advantageously used with the present invention. The aggregation router comprises a plurality of line cards 410 coupled to at least one performance routing engine (PRE 470) via a unidirectional (i.e., point-to-point) interconnect system 440. The line cards 410 include a plurality of input cards 412 having input ports 414 coupled to subscribers 160 and at least one output "trunk" card 416 configured to aggregate the subscriber inputs over at least one output port 418. The PRE 470 is an assembly comprising a fast packet "forwarding" processor (FP) module 452 and a route processor (RP) module 472 adapted to perform packet forwarding and routing operations, respectively. The FP and RP modules are preferably interconnected in a "mezzanine" arrangement to form the PRE 470. The PRE assembly also provides quality of service (QoS) functions for complete packets received from each input line card over the interconnect system. To that end, the interconnect system 440 comprises a plurality of high-speed unidirectional links 442 coupling the PRE to each line card 410.

The RP module 472 is a processor-based, routing system suite comprising functionality incorporated within a typical router. That is, the RP module comprises a general-purpose processor 474 (e.g., a MIPS route processor) coupled to a system controller 476 and memory 478. The memory 478 comprises synchronous dynamic random access memory (SDRAM) storage locations addressable by the processor 474 for storing software programs and data structures accessed by the components. A network routing operating system, portions of which are typically resident in memory and executed by the route processor, functionally organizes the router by, inter alia, invoking network operations in support of software processes executing on the router. The route processor 474 is configured to construct and load routing tables used by the FP module 452. The processor 474 also performs configuration management functions of the aggregation router 400 and communicates with neighboring peer routers to exchange protocol data units used to construct the routing tables in accordance with conventional routing algorithms. It will be apparent to those skilled in the art that other memory means, including various computer readable media, may be used for storing and executing program instructions pertaining to the operation of the router.

Figure 5:
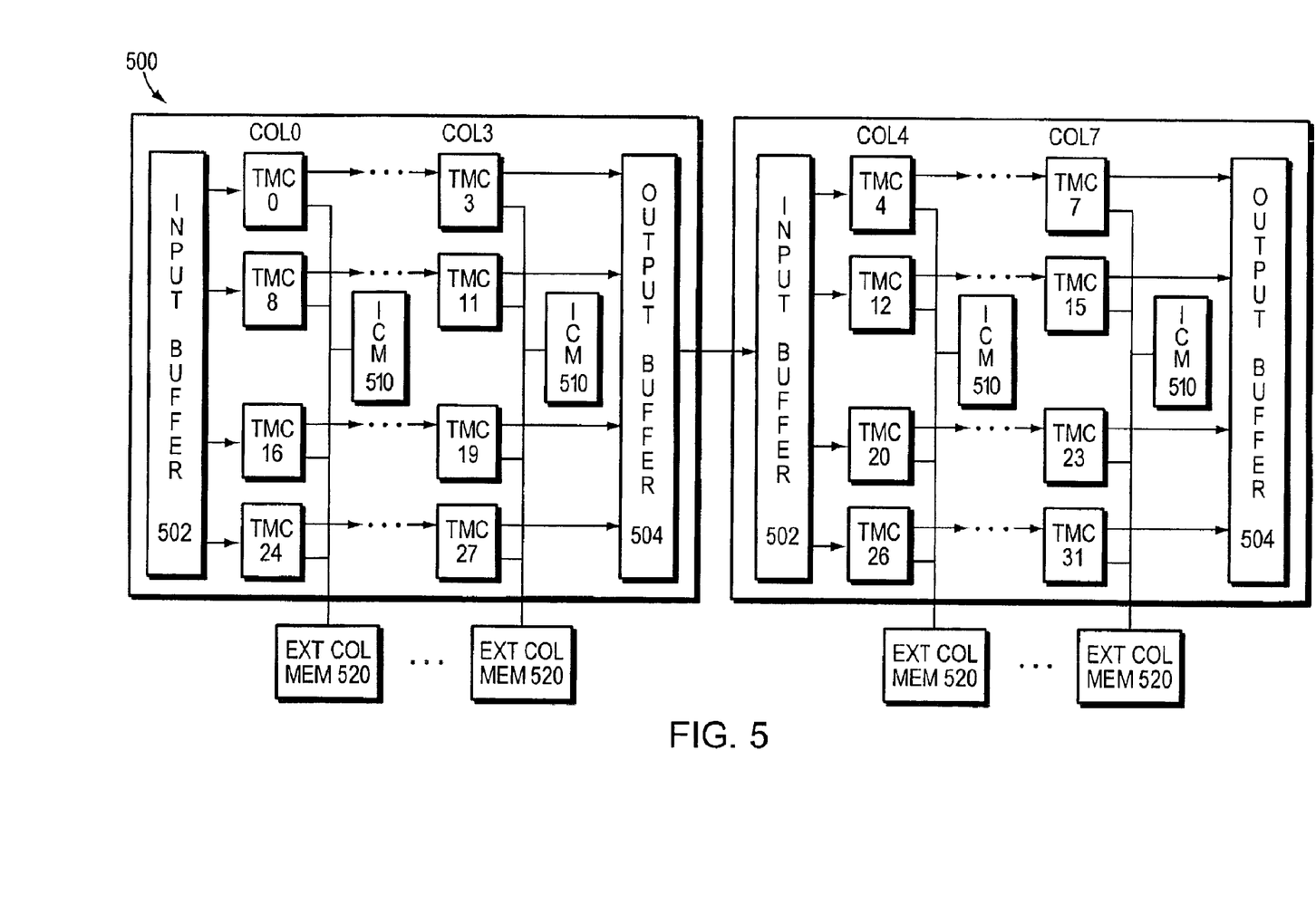
FIG. 5 is a schematic block diagram of a forwarding engine of the aggregation router that may be advantageously used with the present invention.

The FP module 452 is responsible for rendering forwarding decisions for the aggregation router and, to that end, includes a forwarding engine 500 coupled to a high-performance backplane interface logic circuit 480. The backplane logic circuit is preferably embodied as a high performance application specific integrated circuit (ASIC), hereinafter referred to as the Cobalt ASIC, which is configured to interface the line cards to a packet buffer 456 of the FP module. The packet buffer 456 preferably comprises SDRAM devices used to store packets 458 as the forwarding engine 500 determines where and when they should be forwarded within the aggregation router. For example, the packet buffer may be used to store low priority data packets while high priority, low latency voice packets are prioritized by the forwarding engine to an output card (e.g., the trunk card 416) of the aggregation router. An example of a backplane logic circuit that may be advantageously used with the present invention is disclosed in co-pending and commonly-owned U.S. patent application Ser. No. (09/791,063) titled *High Performance Interface Logic Architecture of an Intermediate Network Node*, which application is hereby incorporated by reference as though fully set forth herein.

The aggregation router 400 illustratively includes sixteen (16) line cards 410, each of which may be configured for an OC-12 (622 Mbps) data rate. Thus, the point-to-point links 442 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. (09/791,062) titled *High Performance Protocol for an Interconnect System of an Intermediate Network Node*, which application is hereby incorporated by reference as though fully set forth herein.

Interface circuitry 490 coupled to the ends of the unidirectional links 442 is resident on both the line cards 410 and the backplane logic circuit 480. The interface circuitry 490 includes interconnect ports coupled to the point-to-point links 442 of the interconnect system 440 and implements a unidirectional, point-to-point clock forwarding technique that is configured for direct ASIC-to-ASIC transmission over a backplane of the aggregation router. As a result, the interface circuitry 490a resident on the line cards 410 is preferably embodied within a high-performance ASIC, hereinafter referred to as the Barium ASIC, whereas the interface circuitry 490b is resident on the Cobalt ASIC. The interface circuitry generally converts conventional formats of data received at the line cards 410 to a protocol format for transmission from, e.g., the Barium ASIC over the interconnect system 440 to the Cobalt ASIC. The ASICs also include circuitry to perform cyclic redundancy code (CRC) generation and checking on packets, along with interconnect format checking.

FIG. 5 is a schematic block diagram of the forwarding engine 500 having a computing architecture that comprises a multiprocessing environment configured as a matrix of processors that operate in a parallel (column-wise) as well as a pipeline (row-wise) fashion. The forwarding engine 500 is preferably embodied as two high-performance ASICs with the matrix of processors (e.g., TMC0–TMC31) arrayed as four (4) rows and eight (8) columns in a 4×8 arrayed configuration. However, it will be understood to those skilled in the art that other arrayed configurations, such as an 8×2 or 8×8 array, may be used in accordance with the present invention. Each column of processors is coupled to an internal column memory (ICM 510) and an external column memory (Ext Col Mem 520). An example of a forwarding engine that may be advantageously used with the present invention is disclosed in co-pending and commonly-owned U.S. patent application Ser. No. 09/106,478 that is now U.S. Pat. No. 6,513,108 titled *Programmable Arrayed Processing Engine Architecture for a Network Switch*, which application is hereby incorporated by reference as though fully set forth herein.

Packets enter the forwarding engine 500 through an input buffer 502 and onto a quasi-randomly selected pipeline row where each column of processors processes the packets in accordance with a designated task, i.e., feature. Upon entering the engine, each packet is classified according to the interface over which it is received at the router. Each processor of a column may thus need to "lookup" configuration information, such as state, statistical and configuration data, stored in its ICM 510 or external memory 520 and that are used in connection with each routing and classification feature performed on the packet. The configuration information may be directly related to physical and virtual interfaces of the router. That is, the configuration information may be associated with an asynchronous transfer mode (ATM) virtual circuit (VC) virtual interface and used to process a packet associated with that virtual circuit. Once it completes its processing task, the processor passes the packet to a processor in a next column of the matrix. The packet eventually exits the engine (and each ASIC) through an output buffer 504.

In the illustrative embodiment, a database comprising various data structures may be used to organize the configuration information in the memories. At a specific instance in time as the packets move through the forwarding engine, different packets are at different processor locations within the engine. If changes or updates need to be made to these data structures, it is desirable that they be done in a fashion that does not disrupt the coherency of the database or packets currently being processed by the engine. In addition, there are preferably 128 cycles available to the processors of a column to act on (process) their packets. The processors thus cannot expend substantial time determining the locations of configuration data within the memories that are needed for packet processing. A technique is therefore needed that ensures data coherency throughout the forwarding engine during updates to the database, while also enabling each processor to retrieve the configuration information via a single lookup operation regardless of the interface type associated with the packet.

Specifically, a database management and indexing technique is provided that enables coherent access to and update of dynamic configuration information stored in the database while enabling fast and efficient access to configuration information on an interface, sub-interface and/or virtual circuit basis. According to the present invention, a unique handle, i.e., a virtual common coherency index (VCCI) value is associated with an interface regardless of whether it is a virtual or a physical interface. When a packet 458 enters the forwarding engine 500, it is classified and assigned a VCCI value based upon the interface over which it is received at (or transmitted from) the router. The assigned VCCI value is then passed along with the packet to each feature that processes the packet. The VCCI value thus remains constant for a packet for the duration of packet processing.

Use of the virtual indexing technique serves two purposes: conservation of memory and efficient synchronization. Memory is conserved using the technique by reducing the number of bits required to access configuration, state and statistical data. In addition, the virtual indexing technique allows configuration changes to be easily synchronized across the columns of processors. Synchronization occurs by allowing the index to be "virtualized" and thus changed without affecting packet flow. These two objectives are obtained by having the route processor 474 dynamically assigned VCCI values as needed.

As described herein, an input VCCI value is acquired via a lookup operation in the memories 510, 520 coupled to column 0, whereas an output VCCI value is acquired via a lookup operation in the memories of column 1. Notably, the input VCCI value is associated with the input interface over which the packet is received at the router, whereas the output VCCI value is associated with the output interface over which the packet is transmitted from the router. Each input and output VCCI value is a 14-bit value that flows within a context through a pipeline for use by the processors. Preferably, 16 bits are allocated for passing each VCCI value by way of the context; however, only 14 bits are actually used for the VCCI value. The resulting 14-bit value translates to 16,384 unique VCCI values associated with interface definitions. The aggregation router described herein supports approximately 9,000 unique interfaces. That is, the VCCI value is used to reference 5376 physical interfaces in addition to 4000 virtual circuits and, therefore, must be able to uniquely reference 9376 entities. Therefore, the remaining 7,000 or so VCCI values may be used in accordance with the database management and indexing technique to ensure data coherency in the forwarding engine.

An interface is preferably defined as an element that can be referenced by the combination of a line card number, port number and channel number. A virtual circuit identifier is defined as a frame relay data link control identifier (DLCI), an asynchronous transfer mode (ATM) virtual circuit (VC), or an Ethernet 802.1 q virtual local area network (VLAN) identifier (ID). Each interface has at least one associated VCCI value, even if the interface type does not have virtual circuits so that a single VCCI index can be passed between columns of processors through the context memory. That is, regardless of the interface type, i.e., physical or virtual, the interface is assigned a unique VCCI value.

Two basic indices defined by the present invention include an interface control block (ICB) index and the VCCI value. The ICB index is directly related to the line card/port/channel number, while the VCCI value is directly related to the ICB index/VC identifier. The ICB index is preferably derived from a combination of a 5-bit resource number and 13 bits of a 16-bit channel number associated with the packet. A resource is defined as the line card (slot) through which a packet is either received or transmitted. A channel is defined as a subset of a resource; the resource may have from one to many channels, depending on the particular type of line card. The resulting 18-bit ICB index is used to access a multi-stage mapping arrangement that generates the VCCI value.

Figure 6:
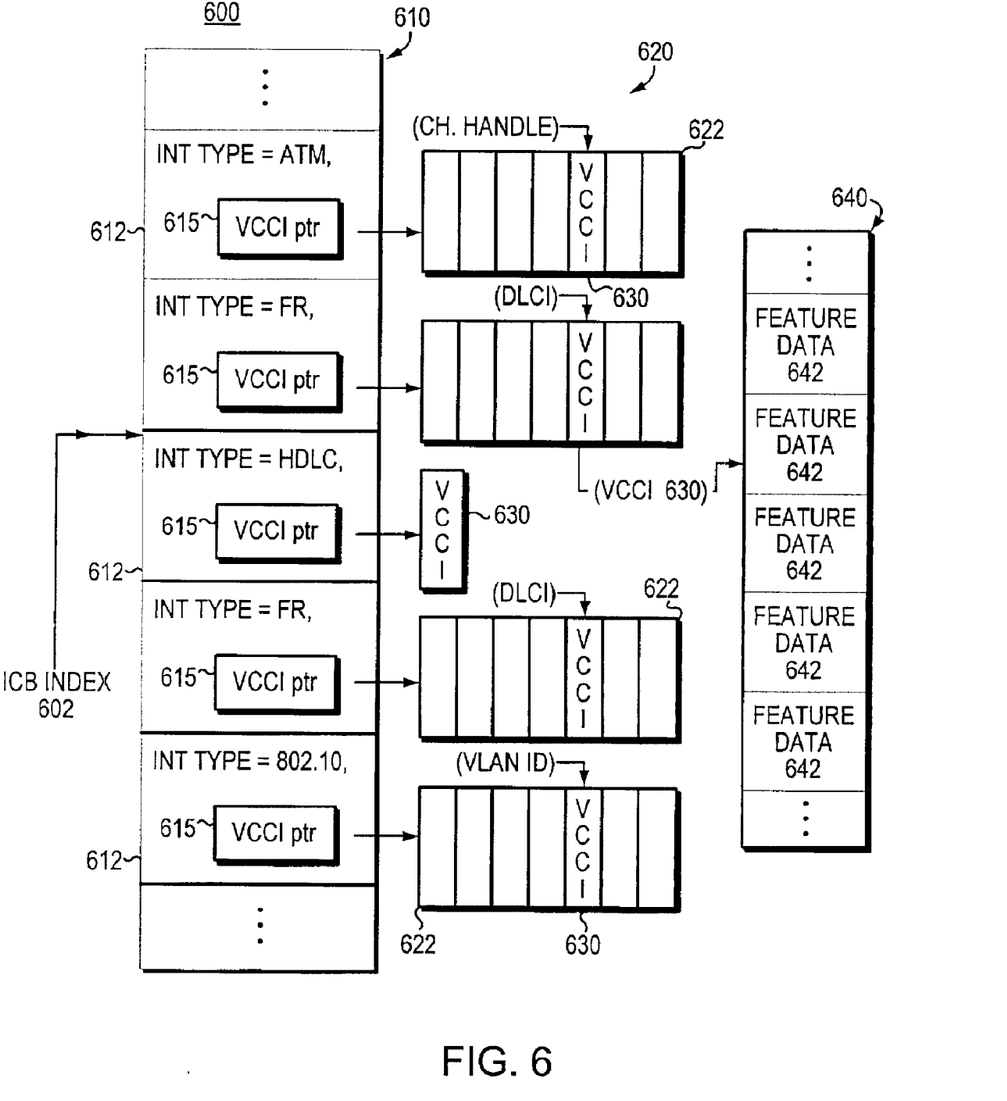
FIG. 6 is a schematic block diagram of a 2-stage mapping arrangement in accordance with the present invention.

FIG. 6 is a schematic block diagram of the multi-stage mapping arrangement 600 according to the present invention. The ICB index and VCCI value are preferably generated at columns 0 and 1 of the forwarding engine. When a new packet arrives in a context (e.g., a new work context) at column 0, the resource number and channel number contained within the context are extracted and used to create the 18-bit ICB index 602. An example of a new work context that may be advantageously used with the present invention is disclosed in co-pending and commonly-owned U.S. patent application Ser. No. (09/790,968) titled, *Mapping Technique for Computing Addresses in a Memory of an Intermediate Network Node*, which application is hereby incorporated by reference as though filly set forth herein.

A first stage of the mapping arrangement involves use of the ICB index 602 to access an entry of an ICB table 610 stored in the external memory 520 or ICM 510 associated with column 0. In the illustrative embodiment, the ICB table 610 contains 218 entries 612 with each entry preferably comprising 8 bytes such that the size of the table is 2 MB. Each entry 612 of the ICB table contains an identification of the interface type over which the packet was received and a VCCI pointer 615 that references an array of VCCI mapping values for the particular interface. As a result of examining the contents of the ICB entry, a second stage lookup operation is performed to obtain the VCCI value. Here, the pointer 615 referencing a mapping data structure 622 of a VCCI mapping array 620 is retrieved from the entry 612. A virtual circuit identifier may also be extracted from the packet data contained in the context and used to index into the VCCI mapping array to obtain a VCCI value 630.

The length of each VCCI mapping array structure 622 preferably depends on the interface type. For simple interfaces, such as HDLC, the VCCI mapping structure 622 contains a single entry and, accordingly, indexing is not required. For complex interfaces, such as frame relay (FR) and ATM, the VCCI mapping array structure contains enough elements to enable it to be indexed by a virtual circuit identifier (e.g., DLCI, VC or VLAN ID) to obtain a VCCI value 630. Thus, the VCCI mapping structures vary in length depending upon the virtual circuit identifier. For example, the FR DLCI is a 10 bit value and, accordingly, its VCCI mapping structure includes 1,024 elements. Likewise, the ATM VC channel handle is a 13-bit value and the VCCI mapping structure associated with this interface type includes 8,192 elements. The VLAN ID is a 12-bit value and its associated VCCI mapping structure includes 4,096 elements.

Upon retrieving the VCCI value 630 from the appropriate structure 622 of the VCCI mapping array 620, the processor in column 0 loads the VCCI value into the context and passes that value to a next processor in its pipeline row. Thus, a function of the processors in column 0 is to compute the ICB index 602 and apply that index to the mapping arrangement in order to retrieve the VCCI value 630. The VCCI value is then forwarded with the packet through all routing and classification features in the forwarding engine 500. The VCCI value is preferably used by "lookup" code of the features to quickly retrieve any configuration information from the database that may be needed to process the packet.

In particular, the VCCI value retrieved by the processors of column 0 is the input VCCI associated with an input interface. The processors of column 1 retrieve an output VCCI value associated with the output interface over which the packet is transmitted. However, the novel mapping arrangement described herein is not used to generate and retrieve the output VCCI value because that value is directly "tied" to a forwarding information base (FIB) table stored in the memories 510, 520 of column 1. The FIB table is organized as a conventional "mtrie" data structure and a routing lookup operation is performed on the table using the IP destination address stored in the packet. The routing lookup operation results in access to a configuration block of information that, among other things, includes the output VCCI value for the output interface.

According to the invention, the VCCI value 630 is used to index into another array of data structures, i.e., the column interface control block (CICB 640), associated with each column. The CICB structures 640 are unique for each column and contain configuration information (i.e., feature data 642) needed by the processors of that column when processing the packet associated with the interface. The CICB data structure is created in a manner that optimizes memory usage as well as memory performance. The number of elements in each CICB structure 640 is preferably $2^{14}$, i.e., the amount of memory required for the CICB is equal to $2^{14}$ times the size of the CICB elements in that column. In the case of multiple CICB structures, each structure is indexed by the VCCI value 630.

Advantageously, the novel indexing technique described herein reduces indexing to a manageable size for all columns of the computing matrix. As noted, the VCCI values retrieved by the processors of columns 0 and 1 are passed to the other processors of the pipeline row for their use when accessing configuration information associated with the interface for the packet. The VCCI values may be passed among these processors using either an inter-column communication mechanism or context memory 455. By passing the VCCI value among the processors, the lookup requirements for the other processors are reduced since they do not need to recalculate that value. In addition, both virtual and physical interfaces are treated similarly as a result of the novel VCCI value. The novel database management and indexing technique also ensures data coherency in the multiprocessing environment of the forwarding engine.

As for this latter advantage, 32 processors (TMC0–TMC31) continuously act on (process) packets within the forwarding engine 500. When the VCCI value is retrieved at column 0 for a particular packet, all processors of the row use the value to access their data structures when retrieving information needed to process the packet. If a user changes the configuration version of a particular interface, those packets associated with the previous version of the interface and that are currently flowing throughout the forwarding engine cannot have their configuration information changed while they are "inflight" without serious consequences. Therefore, when a user decides to reconfigure an interface, a new VCCI value for that interface is created, while the old VCCI value associated with the previous version of that interface remains in place within the forwarding engine.

Specifically, the route processor 474 allocates the VCCI values 630 based on the physical and logical configuration of interfaces on the router 400. These "current" VCCI values are loaded into the data structures of the mapping arrangement 600. As packets are received into the forwarding engine, they are assigned the current VCCI values and those values are passed among the processors to enable access to configuration information associated with the interfaces over which the packets are received. When the configuration information stored in the database and related to a particular interface needs updating, the route processor generates a new VCCI value for that interface.

Illustratively, the route processor manages a list of "virtual numbers" for the VCCI using, e.g., a first-in, first-out (FIFO) queue structure 475 that contains unused VCCI values that may be initialized in numerical order. The depth of this list is dependent upon the maximum number of entities that must be referenced plus additional entities to ensure that a number is not reused before all of the previous references have been moved. Generation of the new VCCI value is achieved by selecting the "oldest" unused VCCI value from a pool of unused values in the queue 475. As noted, the 14-bit VCCI value references 16,384 unique interface definitions; however, only 9,000 unique interface definitions are used. Therefore, the remaining 7,000 possible interface definitions comprise the additional entities that ensure that a value is not reused before all of the previous references have been moved.

The route processor then updates the database of the column memories with new CICB configuration tables for the updated interface that are accessible by the new VCCI value. Once the route processor finishes populating the memories with the new configuration information, it updates the VCCI mapping array 620 with the new VCCI value. That is, the route processor 474 "swaps" the new VCCI value for the current ("old") VCCI value in the VCCI mapping array. Updates to the configuration information database are thus controlled through a single mapping point, e.g., the VCCI mapping array structures.

Notably, these updates occur atomically with respect to packet processing as data coherency is maintained within the computing matrix. That is, new packets entering the forwarding engine matrix and associated with the updated interface are assigned the new VCCI value retrieved by the processors from the mapping arrangement. This new VCCI value is passed within a context to the processors of each pipeline row so that those processors may use that new value to access the updated configuration information when processing the packets. Meanwhile, packets currently in the forwarding engine are processed using the old VCCI value to access the configuration information stored in the prior data structures of the memories. After a period of time sufficient to accommodate the latency needed to "flush" the current packets through the engine, all of the statistics that are based on the current packets are collected. The old VCCI value is then released, i.e., invalidated, by placing it on the available pool of VCCI values in the FIFO queue 475.

Figure 7:
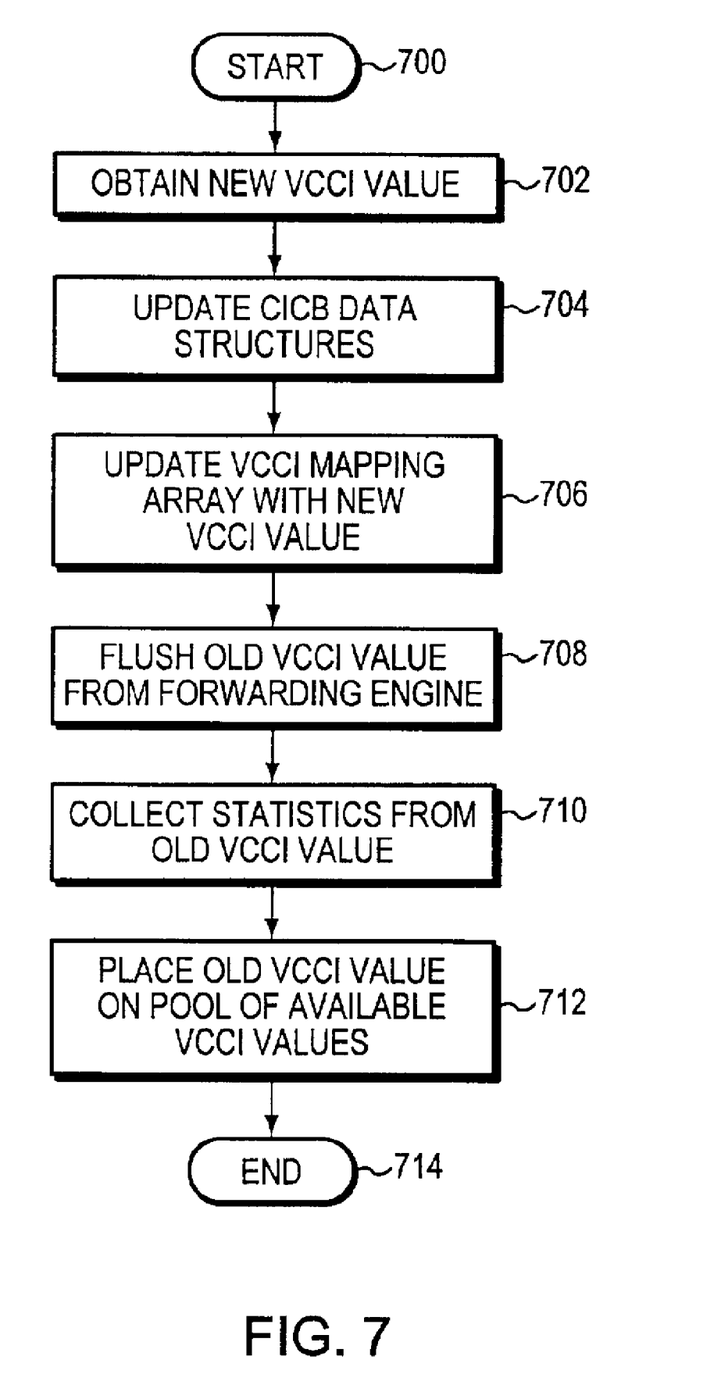
FIG. 7 is a flowchart illustrating the sequence of steps involved with a change/update made to the mapping arrangement in accordance with the present invention.

FIG. 7 is a flowchart illustrating the sequence of steps involved with a change or update that is made to the CICB data structures of the mapping arrangement in the column memories of the forwarding engine 500. The sequence starts at Step 700 and proceeds to Step 702 where the route processor obtains a new VCCI value for the interface being updated/changed. In Step 704, the route processor updates the CICB data structures in all column memories of the forwarding engine at that the new VCCI value offset. In Step 706, the route processor updates the VCCI mapping array in the memories of column with the new VCCI value. After a predetermined time, all the contexts using the old VCCI value are flushed from the engine (Step 708) and, in Step 710, statistics from the old VCCI value are collected and aggregated. In Step 712, the old VCCI value is placed on the free FIFO list. The sequence then ends in Step 714.

According to the novel database management and indexing technique, coherent configuration data across all column memories of the forwarding engine is maintained for all packets, while atomic modification (by means of a "VCCI swap") is possible. A conventional approach to updating such configuration information database is to halt packet processing; however, this approach requires stalling of the processors within the pipelines and then flushing of the packets from those pipelines before the update can be implemented. Clearly, this approach is inefficient and adversely impacts performance of the engine. Therefore, the present invention enables updates to the configuration information database without stalling packet processing on behalf of the processors of the forwarding engine. It should be noted that hash tables may be employed as an alternative to the novel mapping arrangement. Yet, such tables are non-deterministic and thus not as efficient as the multi-stage mapping arrangement described herein. The present invention can be used for both input and output features, although a packet may have both a VCCI-in and a VCCI-out value. Some features may use both values and some may use only one.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for providing coherent access to and update of configuration information stored in a memory associated with a forwarding engine of an intermediate node, the forwarding engine configured as a computing matrix of processors arrayed as columns and pipeline rows, each pipeline row of processors receiving a packet and each column of processors processing the packet in accordance with a designated feature, the method comprising the steps of:

classifying a packet entering a pipeline row of the forwarding engine based upon an interface over which the packet is received at the node;

assigning a unique handle to the packet based upon the interface;

passing the assigned handle to each processor of the pipeline row for processing in accordance with the designated feature, the configuration information used in connection with the feature processed on the packet; and accessing the configuration information using the assigned handle, thereby obviating the need to re-classify the packet and reassign the handle when processing the packet at each processor.

2. The method of claim 1 wherein the handle is a virtual common coherency index (VCCI) value.

3. The method of claim 2 wherein the step of classifying comprises the steps of:

deriving an interface control block (ICB) index from predetermined data associated with the packet; and accessing a multi-stage mapping arrangement using the ICB index to generate the VCCI value.

4. The method of claim 3 wherein the step of deriving comprises the step of combining a resource number and a channel number associated with the packet to obtain the ICB index.

5. The method of claim 3 wherein the step of accessing the multi-stage mapping arrangement comprises the step of accessing an entry of an ICB table stored in the memory associated with the forwarding engine.

6. The method of claim 5 wherein the step of accessing the multi-stage mapping arrangement further comprises the steps of:

examining contents of the ICB entry; and performing a lookup operation to obtain the VCCI value.

7. The method of claim 6 wherein the step of performing comprises the step of retrieving a pointer from the ICB entry, the pointer referencing a mapping data structure of a VCCI mapping array.

8. The method of claim 7 wherein the step of accessing the multi-stage mapping arrangement further comprises the steps of:
   extracting a virtual circuit identifier from the packet; and
   indexing into the VCCI mapping array using the extracted virtual circuit identifier to obtain the VCCI value.

9. The method of claim 7 further comprising the steps of:
   allocating an old VCCI value based on a physical and logical configuration of the interface; and
   loading the old VCCI value into the mapping data structure of the VCCI mapping array.

10. The method of claim 9 further comprising the steps of:
    obtaining a new VCCI value based on a change to the interface;
    updating the configuration information stored in the memory; and
    swapping the new VCCI value for the old VCCI value in the mapping data structure.

11. The method of claim 10 further comprising the steps of:
    assigning the new VCCI value to a new packet entering the forwarding engine based on the changed interface over which the new packet is received at the node; and
    flushing the old VCCI value from the forwarding engine.

12. A system configured to provide coherent access to and update of configuration information within an intermediate node of a computer network, the system comprising:
    an interface of the node, the interface adapted to receive a packet from the computer network;
    a forwarding engine of the node, the forwarding engine configured as a computing matrix of processors arrayed as columns and pipeline rows, each pipeline row of processors receiving the packet from the interface and each column of processors processing the packet in accordance with a designated feature, a first processor of a pipeline row classifying the packet and assigning a unique handle to the packet based upon the interface, the first processor passing the assigned handle to a next processor of the pipeline row for processing in accordance with the designated feature; and
    a memory associated with the forwarding engine, the memory storing the configuration information used in connection with the feature processed on the packet,
    wherein each processor accesses the configuration information in the memory using the assigned handle to thereby obviate the need to re-classify the packet and reassign the handle when processing the packet at each processor.

13. The system of claim 12 wherein the intermediate node is a router.

14. The system of claim 12 wherein the intermediate node is an aggregation router.

15. The system of claim 12 wherein the unique handle is a virtual common coherency index (VCCI) value.

16. The system of claim 15 further comprising a multi-stage mapping arrangement used to generate the VCCI value.

17. Apparatus for providing coherent access to and update of configuration information stored in a memory associated with a forwarding engine of an intermediate node, the forwarding engine configured as a computing matrix of processors arrayed as columns and pipeline rows, each pipeline row of processors receiving a packet and each column of processors processing the packet in accordance with a designated feature, the apparatus comprising:
    means for classifying a packet entering a pipeline row of the forwarding engine based upon an interface over which the packet is received at the node;
    means for assigning a unique handle to the packet based upon the interface;
    means for passing the assigned handle to each processor of the pipeline row for processing in accordance with the designated feature, the configuration information used in connection with the feature processed on the packet; and
    means for accessing the configuration information using the assigned handle, thereby obviating the need to re-classify the packet and reassign the handle when processing the packet at each processor.

18. The apparatus of claim 17 wherein the handle is a virtual common coherency index (VCCI) value and wherein the means for classifying comprises:
    means for deriving an interface control block (ICB) index from predetermined data associated with the packet; and
    means for accessing a multi-stage mapping arrangement using the ICB index to generate the VCCI value.

19. The apparatus of claim 18 wherein the means for accessing the multi-stage mapping arrangement further comprises:
    means for extracting a virtual circuit identifier from the packet; and
    means for indexing into a VCCI mapping array using the extracted virtual circuit identifier to obtain the VCCI value.

20. The apparatus of claim 19 further comprising:
    means for allocating an old VCCI value based on a physical and logical configuration of the interface; and
    means for loading the old VCCI value into the mapping data structure of the VCCI mapping array.

21. The apparatus of claim 20 further comprising:
    means for obtaining a new VCCI value based on a change to the interface;
    means for updating the configuration information stored in the memory; and
    means for swapping the new VCCI value for the old VCCI value in the mapping data structure.

22. The apparatus of claim 21 further comprising:
    means for assigning the new VCCI value to a new packet entering the forwarding engine based on the changed interface over which the new packet is received at the node; and
    means for flushing the old VCCI value from the forwarding engine.

23. A computer readable medium containing executable program instructions for providing coherent access to and update of configuration information stored in a memory associated with a forwarding engine of an intermediate node, the forwarding engine configured as a computing matrix of processors arrayed as columns and pipeline rows, each pipeline row of processors receiving a packet and each column of processors processing the packet in accordance with a designated feature, the executable program instructions comprising program instructions for:

classifying a packet entering a pipeline row of the forwarding engine based upon an interface over which the packet is received at the node;

assigning a unique handle to the packet based upon the interface;

passing the assigned handle to each processor of the pipeline row for processing in accordance with the designated feature, the configuration information used in connection with the feature processed on the packet; and accessing the configuration information using the assigned handle, thereby obviating the need to re-classify the packet and reassign the handle when processing the packet at each processor.

24. The computer readable medium of claim 23 wherein the handle is a virtual common coherency index (VCCI) value and wherein the program instruction for classifying comprises program instructions for:

deriving an interface control block (ICB) index from predetermined data associated with the packet; and accessing a multi-stage mapping arrangement using the ICB index to generate the VCCI value.

25. The computer readable medium of claim 24 wherein the program instruction for accessing the multi-stage mapping arrangement further comprises program instructions for:

extracting a virtual circuit identifier from the packet; and indexing into a VCCI mapping array using the extracted virtual circuit identifier to obtain the VCCI value.

26. The computer readable medium of claim 25 further comprising program instructions for:

allocating an old VCCI value based on a physical and logical configuration of the interface; and loading the old VCCI value into the mapping data structure of the VCCI mapping array.

27. The computer readable medium of claim 26 further comprising program instructions for:

obtaining a new VCCI value based on a change to the interface;

updating the configuration information stored in the memory; and swapping the new VCCI value for the old VCCI value in the mapping data structure.

28. The computer readable medium of claim 27 further comprising program instructions for:

assigning the new VCCI value to a new packet entering the forwarding engine based on the changed interface over which the new packet is received at the node; and flushing the old VCCI value from the forwarding engine.

* * * * *